United States Patent [19]

Schneider et al.

[11] 3,949,055

[45] Apr. 6, 1976

[54] PROCESS FOR OXIDATIVE DESTRUCTION OF GASEOUS OR SMOKE-LIKE SUBSTANCES

[76] Inventors: Wilhelm Schneider, Ortsstr. 29/30, Heidenrod-Egenrod; Wilhelm Fresenius, Kapellenstr - 13, Wiesbaden; Remigius Fresenius, Gartenfeldstr. 10, Heidenrod-Zorn; Ludwig Fresenius, Kapellenstr. 13, Wiesbaden, all of Germany

[22] Filed: May 16, 1974

[21] Appl. No.: 470,464

[30] Foreign Application Priority Data

May 16, 1973 Germany............................ 2324625

[52] U.S. Cl. ................ 423/210; 423/220; 423/224; 423/235; 423/245; 423/246
[51] Int. Cl.²........................................ B01D 47/00
[58] Field of Search ........... 423/210, 220, 224, 235, 423/245, 246

[56] References Cited
UNITED STATES PATENTS

| | | | |
|---|---|---|---|
| 632,400 | 9/1899 | Chollar | 423/224 |
| 3,761,569 | 9/1973 | Heiba et al. | 423/224 |

FOREIGN PATENTS OR APPLICATIONS

| | | | |
|---|---|---|---|
| 1,182,255 | 2/1970 | United Kingdom | 423/224 |
| 709,772 | 6/1954 | United Kingdom | 423/224 |
| 28,765 | 3/1905 | United Kingdom | 423/224 |

*Primary Examiner*—L. Dewayne Rutledge
*Assistant Examiner*—Arthur J. Steiner

[57] ABSTRACT

Air contining objectionable gaseous or smoky materials is purified by contacting and reacting the objectionable substances with an aqueous solution of ozone. The solution may be acidic or alkaline and preferably contains about 0.1 to 10 grams of ozone per cubic meter of solution.

The ozone and the substance to be treated may be injected simultaneously into the treating solution, and the treatment may be conducted by counter-current washing.

7 Claims, 1 Drawing Figure

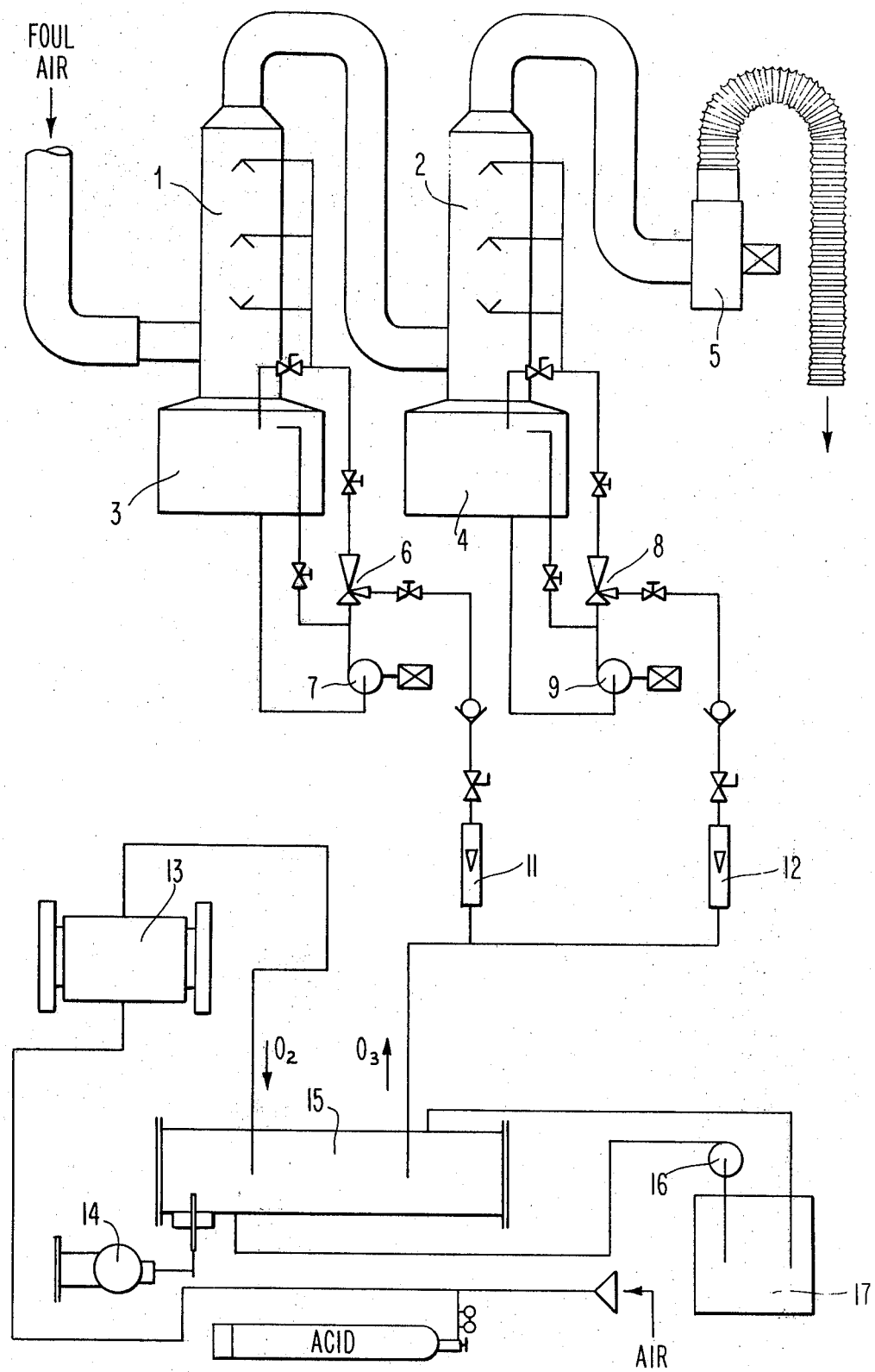

PROCESS FOR OXIDATIVE DESTRUCTION OF GASEOUS OR SMOKE-LIKE SUBSTANCES

DISCUSSION OF THE PRIOR ART

One of the important problems in many industrial areas, sewage installations, and municipal plants is the elimination of gaseous or smoke-like substances which lead to air pollution, produce bad odors, or even lead to health problems in living beings.

For example, efforts have been made for a long time to find a practical way of eliminating nitrous gases, hydrogen sulfide and other odorous substances from the gases given off by industrial plants and sewage installations, all without success up to the present time in solving these problems satisfactorily.

By way of example, attempts have already been made to treat oxidizable gaseous substances such as odorous substances and gaseous nitrogen oxides by adding gaseous ozone, but this was found to produce only a very low degree of efficiency (a maximum of 10 to 20%).

OBJECTS OF THE INVENTION

It is an object of this invention to provide a highly effective process for destroying oxidizable gaseous or smoke-like substances, which is inexpensive with respect to the apparatus which is needed and with respect to the oxidation agents which are used, which does not require too much treatment or reaction time, and which can therefore be applied effectively to widely different areas of use for the purpose of preventing air pollution.

DESCRIPTION OF THE INVENTION

The process in accordance with the invention accomplishes the oxidative destruction of oxidizable gaseous or smoke-like substances with ozone, and is characterized by the fact that these substances are treated with an aqueous solution of ozone. In doing this, it is preferable to use an ozone solution obtained by introducing ozone into an aqueous medium, preferably an aqueous solution which is acidic or alkaline.

It is very surprising that, in contrast to the observations up to the present time in the course of carrying out treatment with ozone in the gas phase, the present process leads to a great, partially quantitative effectiveness when an aqueous solution of ozone is used, and that even exhaust gases and odorous substances which are difficult to destroy can be eliminated to a major extent or even completely. This result is even more surprising in view of the fact that ozone itself reacts only slowly and incompletely with the oxidizable substances in a moist gas chamber, and even then, poor results are obtained when, by way of example, the gaseous or smoke-like substances and, separately from these, gaseous ozone is introduced into a gas washer which is sprayed with water.

DRAWINGS

The drawing is a flow diagram showing one form of apparatus in which this invention may be carried out.

DETAILED DESCRIPTION OF THE INVENTION

Referring to the drawing, which shows only one form of the invention and is not intended to limit the scope of the claims, air containing oxidizable gaseous or smoke-like substances is introduced into a first stage washer 1, and passes through it to a second stage washer 2. Number 3 designates a tank containing a washing medium for the first stage, and 4 designates a tank containing a washing medium for the second stage. An exhaust blower 5 draws the air through the first and second stage washers, and exhausts it as pure air.

The numbers 6 and 8 designate injectors for the first and second stages respectively, and the numbers 7 and 9 refer to centrifugal pumps, also for the first and second stages respectively.

An ozone generator 15 is provided, which introduces ozone through volumetric indicators 11 and 12 into the injectors 6 and 8. The ozone is prepared from air which is introduced and mixed with oxygen from container 18, into a drying chamber 13, forming dry oxygen which is fed to the ozone generator, which is actuated by a transformer 14 which generates a voltage up to about 15,000 volts. A pumping circuit is actuated by a pump 16 for circulating cooling water from the tank 17 through the ozone generator 15.

The process in accordance with the invention may be conducted in such a way that the gaseous or smoke-like substances which are to be destroyed oxidatively are introduced into an aqueous, preferably acid or alkaline ozone solution. In doing this, one can proceed in such a way that the gaseous or smoke-like flow of the substances to be destroyed is delivered continuously into water and separately from this, gaseous ozone is also introduced continuously into the water, or an alkali solution such as caustic soda, or a dilute solution of a mineral acid such as sulfuric acid.

Alternatively, it is also possible to dissolve the gaseous or smoke-like material directly in water, alkalis, acids, or other chemical solutions and to subject such a solution to reaction with ozone. This, in may cases has the disadvantage that, when brought together, the gaseous or smoke-like material is only poorly absorbed by the water, the alkalis or the acids.

Instead of this, however, the gaseous or smoke-like substances can also be introduced continuously into the upper end of a gas scrubber, or into some other spraying installation, and the aqueous solution of ozone may be pumped in at the upper end and expediently revolved and removed from the lower end of the gas scrubber.

Depending upon the nature of the gaseous or smoke-like exhaust gases, odorous substances and the like, all of which have to be destroyed, it can be more advantageous to use either an acidic or an alkaline solution of ozone. Alkaline ozone solutions generally have greater efficacy. Whether the ozone solutions are alkaline, neutral, or acidic, it is expedient to use a concentration of 0.3–10, preferably 0.5–5, and particularly 1–3 g ozone per $m^3$ solution. Sodium hydroxide or potassium hydroxide are the preferred media for alkaline ozone solutions. It is particularly preferable to use sodium hydroxide, which preferably has a caustic alkali concentration of about 3 to 20%, for example, 10%. When mineral acid solutions are used, such as aqueous sulfuric acid, it is preferred to use concentrations of acid ranging from about 1 to 10% such as, by way of example, 5%.

In the course of oxidative destruction of hydrogen sulfide in accordance with the process according to the invention, substantially complete destruction can be achieved. This is true even of exhaust gases or odorous gases which are difficult to destroy, for example, such as nitrous exhaust gases or $SO_2$. It is also possible, on a large scale technical operation as in the case with gas scrubbers or sprayed packed columns, to achieve at least 90% elimination of the undesired substances.

The process in accordance with the invention is suitable, with varying rates of effectiveness, for the destruction of essentially all oxidizable gaseous or aerosol-type substances such as hydrogen sulfide, sulfur dioxide, nitrous oxides, phenols, amines, mercaptans, and other sulfur compounds, fatty acids, or organic odorous substances.

By way of example, using the process in accordance with the invention, one can destroy the phenols which are contained in carbon dioxide produced for the mineral water industry, and thereby obtain an excellent grade of carbon dioxide for addition to mineral water or other drinks. Accordingly, gaseous or aerosol mixtures can be treated in accordance with this invention as well, in order to remove undesired oxidizable components from them, and in order to produce in a purified form the components of the gaseous or aerosol-type mixture which are resistant to the oxidative attack of ozone.

Since the process in accordance with the invention is particularly suitable for the elimination of substances which cause odors as well such as those occurring as mixed odors, for example, in sewage plants, slaughter houses, fish stores, etc., there is therefore a particularly broad area of use for this process. It is often particularly suitable to operate in two successive alkali-acid stages; the first stage operation may subject the gas to an alkaline aqueous solution of ozone, such as a 10% sodium hydroxide solution containing ozone, and in the second stage with an acid aqueous solution of ozone such as 5% sulfuric acid containing ozone, for example.

EXAMPLES

The following examples, some of which were performed on a laboratory scale and some of which were performed on a large technical scale, serve as further explanations of the invention. They are not intended to limit the scope of the invention, as defined in the claims.

EXAMPLE 1

In a gas scrubber of the usual construction and operating in a single stage, 10% sodium hydroxide was supplied at the top end and pumped back to the jets at the top end by a sump pump at the bottom of the gas scrubber. Using the counterflow principle, air from a sewage plant with the usual odorous substances from community fecal matter was blown in at the bottom end of the gas washer with a throughput of 520 m$^3$ per hour and released to the atmosphere at the upper end of the gas washer. For the duration of the test, the input temperature of the air was 17.5°C, the output temperature of the air 25°C, the temperature of the sodium hydroxide 23°C, and the outside temperature 19°C.

For purposes of comparison, the test was performed on the one hand with the 10% sodium hydroxide solution alone and on the other hand with a 10% sodium hydroxide solution which had been enriched with 1.5 g ozone per m$^3$, as supplied by a conventional ozone generator. After a while, a certain quantity of the treated air was sampled in both cases at the upper outlet of the gas scrubber, diluted with air free of odors to various degrees of dilution, and then tested by several human testers with respect to odor properties, the test subjects recording their perceptions separately.

At a volumetric dilution of 1:80 of the air which was treated only with sodium hydroxide, a marked odor was determined to exist, while in the case of the air which was treated with the alkaline solution of ozone, no odor could be detected anymore, even at a dilution of only 1:53. In the case of untreated air, it was possible to determine a noticeable fecal odor even at a volumetric dilution of 1:320.

EXAMPLE 2

The test described in Example 1 was repeated with the same installation and with the same malodorous air as the raw material, but the quantity of ozone in the sodium hydroxide solution was varied and in the course of a further modification, two gas washers were operated, one of which was used with a 10% sodium hydroxide solution; the other with a 5% sulfuric acid solution. Both the 10% hydroxide and the 5% sulfuric acid solutions each contained ozone taken from a conventional ozone generator, in an amount of 0.4 gram per m$^3$ solution.

It was no longer possible to detect any odor at a dilution of 1:80 of the air treated in a single step only with ozone solution in sodium hydroxide, which traces of a sweetish odor could still be perceived at a dilution of 1:53. After the treatment with sodium hydroxide alone, however, a marked unpleasant odor could again be perceived, at both ratios of dilution.

In the course of a 1:53 dilution of the air which was treated in two stages with ozone in a sodium hydroxide solution and in a sulfuric acid solution, it was no longer possible to perceive any odor.

EXAMPLE 3

The experimental setup of Example 2 was repeated again in a single stage and in two stages, but again while modifying the content of ozone in the treatment solutions as well as the throughput. The content of both the 10% sodium hydroxide solution as well as of the 5% sulfuric acid solution was 0.8 g/m$^3$ in this example, and the throughput of malodorous air was 780 to 800 m$^3$ per hour.

At a dilution of 1:80 of the air which was treated in a single stage with ozone in the sodium hydroxide solution, it was no longer possible to perceive any odor. A dilution of the same air which was treated in a single stage to 1:53 produced a slight synthetic sweetish odor.

The air which was treated in two stages with ozone in the sodium hydroxide solution and subsequently with ozone in the sulfuric acid no longer produced any odor which was possible to perceive in the course of either volumetric dilution ratio. The untreated air still had a clear fecal odor at a volumetric dilution ratio of 1:320.

EXAMPLE 4

The single stage and double stage processes of Example 2 were repeated; a 10% sodium carbonate solution with 0.6 g ozone per m$^3$ was used in the first stage and a 5% sulfuric acid solution with 0.6 g ozone per m$^3$ was used in the second stage. The throughput of malodorous air through the gas scrubber was 520 m$^3$ per hour in this example. The inlet temperature of the air was 23°C, the outlet air temperature 26°C, the temperature of the soda solution 25°C, and the outside temperature 24°C.

Again, the untreated air produced a clear fecal odor even at a volumetric dilution of 1:30. The air treated in a single stage with ozone in the soda solution produced a very weak odor vaguely resembling that of cabbage at a dilution of 1:80, and produced a clear cabbage odor at a dilution of 1:53. After a two stage treatment, first with ozone in the soda solution and then with ozone in the sulfuric acid, no odor could be detected anymore, even at a dilution of only 1:53.

EXAMPLE 5

In a gas scrubber of the usual construction and operating in two stages, a 10% sodium hydroxide solution with ozone contents varying from 0.1 to 1.5 g/m$^3$ was supplied in the first stage, and a 5% sulfuric acid solution with ozone contents varying from 0.1 to 1.5 g/m$^3$ was supplied in the second stage. Alternatively, such ozone quantities were added with an injector, using a high-pressure pump; in this manner they were injected into the solution of sodium hydroxide or sulfuric acid which had been pumped up to the nozzles from the sump. Air with 1000 ppm H$_2$S was supplied to the gas scrubber with a throughput of 300 m$^3$ per hour. At the outlet of the gas scrubber, it was no longer possible to detect any traces of hydrogen sulfide, using a gas tracer tube.

When the same apparatus was used and operated in two stages under the same experimental conditions, using 10% sodium hydroxide or 5% sulfuric acid alone, without the addition of ozone, a quantity of hydrogen sulfide between 10 and 50 ppm was detected and determined at the outlet of the gas washer.

EXAMPLE 6

In tests in a laboratory installation, 1000 ppm each of hydrogen sulfide, sulfur dioxide and nitrous gases were added to air, whereupon 1 ppm ozone was mixed in each case with the stream of air which had been contaminated in this way. The stream of air which had been contaminated and enriched with ozone was divided into two partial streams. One stream was reacted in the gas phase in a flow-through reactor. The other stream was also exposed to ozone in a 10% sodium hydroxide solution. The additional stream of ozone was introduced into the sodium hydroxide at a controlled speed to maintain its ozone content constant at approximately 0.5 ppm. In the stream of gas emerging from the sodium hydroxide, it was not possible in any of the tests to detect hydrogen sulfide, sulfur dioxide or nitrous oxides. However, at the outlet of the gas phase reactor, in even the best results there was only a 10 to 20% decrease in the hydrogen sulfide, sulfur dioxide or nitrous oxide content.

The following is claimed:

1. In a process for the oxidative destruction of an oxidizable gaseous or smoke-like substance, such substance being an odorous oxidizable gaseous substance of the class contained in gases given off by industrial plants sewage installations, the steps which comprise introducing ozone into an alkaline aqueous medium to form a solution containing about 0.1 – 10 grams of dissolved ozone per cubic meter of solution, and intimately contacting and reacting said substance with said aqueous solution of ozone.

2. Process according to claim 1, characterized by the fact that said substance is further contacted and reacted, in a separate step, with an acidic aqueous solution of ozone.

3. Process according to claim 1 characterized by the fact that said substances and said ozone are separately introduced continuously into said aqueous solution of ozone.

4. Process according to claim 1 characterized by the fact that said substances are washed counter-currently with the ozone solution.

5. Process according to claim 1 characterized by the fact that the ozone solution contains about 0.5 to 5 grams of ozone per m$^3$ of the solution.

6. Process according to claim 1 characterized by the fact that the ozone solution contains about 1 to 3 grams of ozone per m$^3$ of the solution.

7. Process according to claim 1 characterized by the fact that said ozone is dissolved in sodium hydroxide.

* * * * *